US010518495B2

(12) United States Patent
 Oguchi

(10) Patent No.: US 10,518,495 B2
(45) Date of Patent: Dec. 31, 2019

(54) COVER TAPE FEED DEVICE

(71) Applicants: Fuji Seiko Co., Ltd., Gifu-ken (JP); Fuji Shoji Co., Ltd, Gifu-ken (JP)

(72) Inventor: Hiroshi Oguchi, Hashima (JP)

(73) Assignees: FUJI SEIKO CO., LTD. (JP); FUJI SHOJI CO., LTD (JP)

( * ) Notice: Subject to any disclaimer, the term of this patent is extended or adjusted under 35 U.S.C. 154(b) by 767 days.

(21) Appl. No.: 14/759,709

(22) PCT Filed: Jan. 17, 2013

(86) PCT No.: PCT/JP2013/050800
§ 371 (c)(1),
(2) Date: Sep. 18, 2015

(87) PCT Pub. No.: WO2014/112069
PCT Pub. Date: Jul. 24, 2014

(65) Prior Publication Data
US 2016/0009043 A1    Jan. 14, 2016

(51) Int. Cl.
 *B29D 30/50* (2006.01)
 *B65G 25/04* (2006.01)
(52) U.S. Cl.
 CPC .............. *B29D 30/50* (2013.01); *B65G 25/04* (2013.01)
(58) Field of Classification Search
 CPC .............. B29D 30/50; B29D 2030/486; B29D 2030/487; B29D 2030/3078;
(Continued)

(56) References Cited

U.S. PATENT DOCUMENTS

| 1,497,296 A | * | 6/1924 | Stevenson | ............... B65H 39/16 |
| | | | | 101/248 |
| 2,503,680 A | * | 4/1950 | Newman | ................... B41L 1/24 |
| | | | | 428/157 |

(Continued)

FOREIGN PATENT DOCUMENTS

| CN | 2558630 Y | 7/2003 |
| CN | 201089223 Y | 7/2008 |

(Continued)

OTHER PUBLICATIONS

International Search Report for PCT/JP2013/050800, dated Mar. 26, 2013, pp. 1-2.

(Continued)

*Primary Examiner* — Geoffrey L Knable
(74) *Attorney, Agent, or Firm* — Tarolli, Sundheim, Covell & Tummino LLP

(57) ABSTRACT

A cover tape feed device is provided to feed a cover tape onto the surface of a bead core. The cover tape feed device includes a conveyance member that is capable of reciprocating between an advanced position and a retracted position. The conveyance member moves from the retracted position to the advanced position while supporting the cover tape and conveys the cover tape onto the surface of the bead core. The cover tape feed device includes a guide roller for guiding a feed of the cover tape, which is arranged to be rotational at a position farther from the bead core than the conveyance member is from the bead core, and a transmission mechanism that converts movement from the retracted position to the advanced position of the conveyance member into rotation in a tape feeding direction of the guide roller.

5 Claims, 3 Drawing Sheets

(58) Field of Classification Search
CPC ............ B29D 2030/3085; B65G 25/00; B65G 25/04; B65G 25/06; B65G 25/08
See application file for complete search history.

(56) References Cited

U.S. PATENT DOCUMENTS

| | | | | |
|---|---|---|---|---|
| 3,556,372 | A | * | 1/1971 | Barnes et al. ......... H05K 13/06 226/115 |
| 3,595,724 | A | * | 7/1971 | Leblond ............. B29D 30/1621 156/353 |
| 3,876,488 | A | * | 4/1975 | Uemura ............. B29D 30/3007 156/123 |

FOREIGN PATENT DOCUMENTS

| | | | | |
|---|---|---|---|---|
| JP | S62174127 | A | | 7/1987 |
| JP | 62236729 | A | | 10/1987 |
| JP | 08142227 | A | | 6/1996 |
| JP | 11-165360 | A | * | 6/1999 |
| JP | 2011-178030 | A | * | 9/2011 |
| JP | 2011178030 | A | | 9/2011 |
| JP | 2012-250424 | A | * | 12/2012 |
| SU | 1553403 | A1 | | 3/1990 |
| SU | 1680569 | A1 | | 9/1991 |

OTHER PUBLICATIONS

Office Action for Chinese Application No. 201380070202.7 dated Jul. 5, 2016.
Russian Office Action for Application No. 2015133677/05(051797) dated Oct. 25, 2016.

* cited by examiner

COVER TAPE FEED DEVICE

RELATED APPLICATIONS

The present invention is a U.S. National Stage under 35 USC 371 patent application, claiming priority to Serial No. PCT/JP2013/050800, filed on 17 Jan. 2013; the entirety of which is incorporated herein by reference.

BACKGROUND OF THE INVENTION

The present invention relates to a cover tape feed device for feeding a cover tape onto the surface of a bead core, which is used for a tire. The cover tape is adhered to the bead core to cover the surface.

This type of device feeds, to a bead core, a cover tape that is to be wound around the surface of the bead core in order to prevent disorder of a wire included in the bead core and to improve tackiness (adhesiveness) between the bead core and the tire ply.

In a conventional configuration, a cover tape delivered from a feeding source is longitudinally elongated by being pulled when an edge of the cover tape that is wound around a bead core is fed onto the bead core. This causes a problem of a decrease in the width of the cover tape so that the cover tape cannot ensure a necessary width for covering the surface of the bead core.

SUMMARY OF THE INVENTION

Accordingly, it is an object of the present invention to provide a cover tape feed device that limits the decrease in the width of a cover tape, which is caused by the longitudinal elongation of the cover tape when being fed onto a bead core.

To achieve the above object, a cover tape feed device serves to feed a cover tape onto the surface of a bead core. The cover tape feed device is characterized by including a conveyance member that is capable of reciprocating between an advanced position and a retracted position, a guide roller for guiding a feed of the cover tape, and a transmission mechanism that converts movement from the retracted position to the advanced position of the conveyance member into rotation in a tape feeding direction of the guide roller. The conveyance member moves from the retracted position to the advanced position while supporting the cover tape and conveys the cover tape onto the surface of the bead core. The guide roller is arranged to be rotational at a position farther from the bead core than the conveyance member is from the bead core. Here, the surface of the bead core refers to the entire surface of the bead core, including the inner and outer circumferential parts.

Thus, in the cover tape feed device, the conveyance member moves toward the bead core while supporting the cover tape so that the cover tape is conveyed to a predetermined position on the surface of the bead core. At this time, the transmission mechanism converts the movement from the retracted position to the advanced position of the conveyance member into rotation in the tape feeding direction of the guide roller. Accordingly, the guide roller steadily rotates in the tape feeding direction, and the cover tape is delivered onto the bead core with no resistance. This eliminates a risk of decreasing the width of the cover tape, which is caused by the longitudinal elongation of the cover tape when being fed onto the bead core. Thus, the cover tape is allowed to ensure a necessary width for covering the surface of the bead core.

The cover tape feed device demonstrates an effect of reducing a risk of decreasing the width of a cover tape, which is caused by the longitudinal elongation of the cover tape when being fed onto a bead core.

DETAILED DESCRIPTION OF THE PREFERRED EMBODIMENTS

A cover tape feed device according to one embodiment of the present invention will now be described with reference to the drawings.

Figure 1:
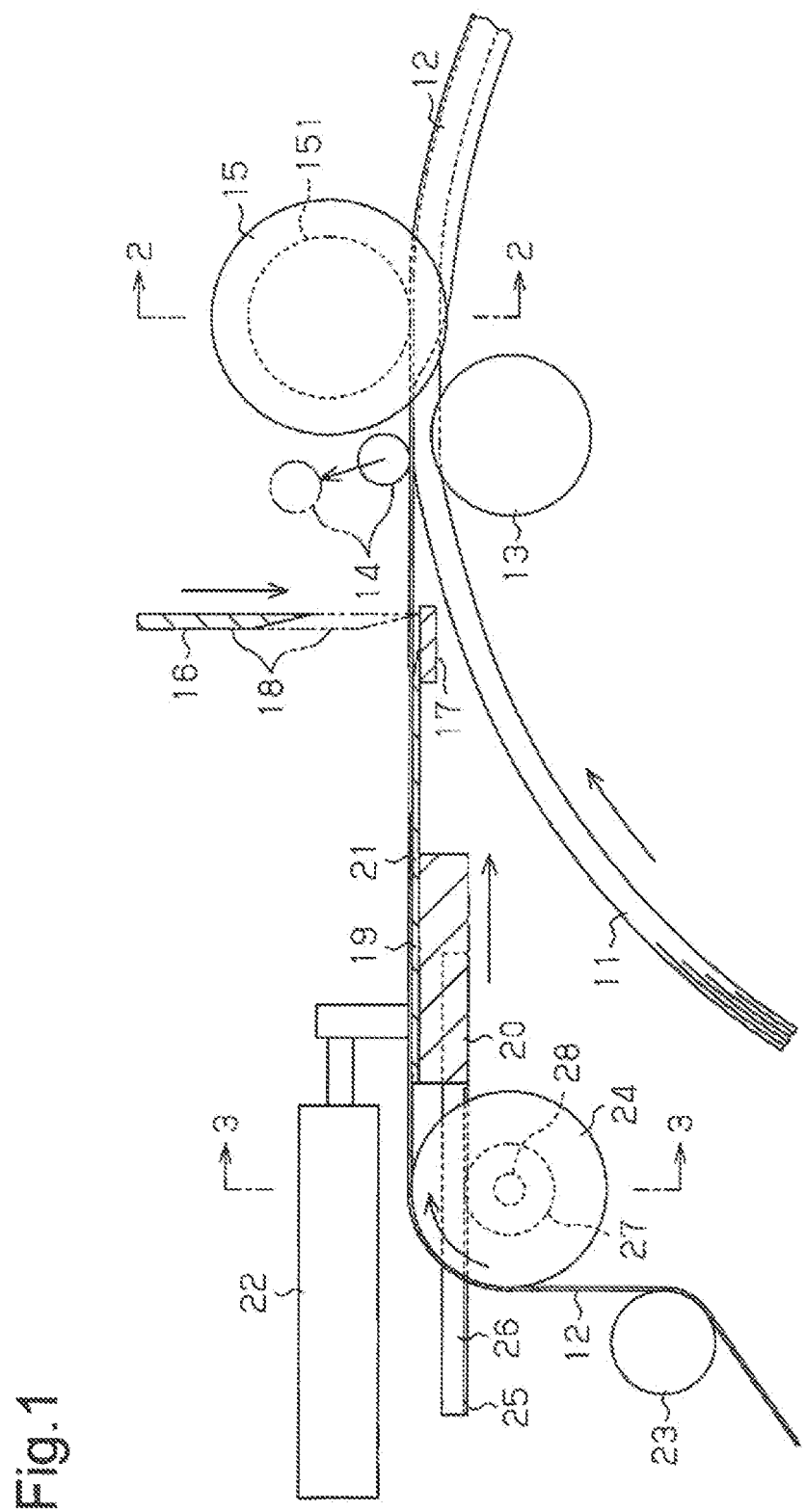
FIG. 1 is a cross-sectional view showing a primary part of a cover tape feed device according to one embodiment.

As shown in FIG. 1, the device according to the present embodiment includes an annular bead core 11, which is formed of a wound wire. The bead core 11 is arranged to be rotational about a horizontal axis that passes through the center of the bead core 11. The bead core 11 rotates clockwise as indicated by an arrow in FIG. 1 by a driving roller (not shown), which contacts the inner circumferential surface and the outer circumferential surface of the bead core 11. A non-vulcanized cover tape 12 is delivered to a predetermined position on the outer circumferential surface of the bead core 11 from the left side of FIG. 1. The position to which the cover tape 12 is delivered onto the bead core 11 is set such that a supporting roller 13 contacts the inner circumference of the bead core 11. A pressing roller 14 is arranged radially outside the bead core 11 at a position corresponding to the supporting roller 13. The pressing roller 14 presses the cover tape 12 against the outer circumferential surface of the bead core 11. The pressing roller 14 is movable between a pressing position (the lower position) indicated by a solid line in FIG. 1 and a position distant from the bead core 11 (the upper position) indicated by a dashed line in shown in FIG. 1. The pressing roller 14 presses the cover tape 12 at the pressing position.

Figure 2:
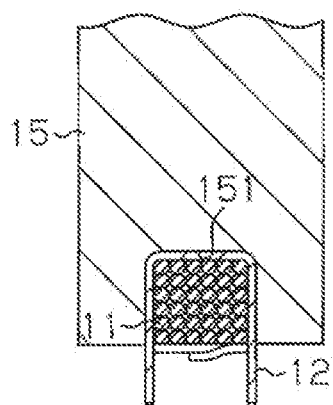
FIG. 2 is a partially enlarged cross-sectional view taken along line 2-2 of FIG. 1.

As shown in FIGS. 1 and 2, a shaping roller 15 is arranged on the opposite side of the pressing roller 14 from the feeding side of the cover tape 12, i.e., on the right side of FIG. 1. The shaping roller 15 includes a grooved shaping face 151 in the outer circumference. As shown in FIG. 2, the shaping face 151 of the shaping roller 15 folds the widthwise edges of the cover tape 12, and the cover tape 12 is adhered to the bead core 11 to cover the surface of the bead core 11. An edge shaping roller (not shown) is arranged on the right side of the shaping roller 15. The edge shaping roller shapes the cover tape 12 to hold the edges toward the inner circumferential surface of the bead core 11. The cover tape 12, of which one edge is laid on the other, is adhered to the surface of the bead core 11 indicated by a dashed line in FIG. 2. In this way, the cover tape 12 covers the surface of the bead core 11.

As shown in FIG. 1, a cutting mechanism 16 for cutting the cover tape 12 is arranged on the feeding side of the cover tape 12 from the pressing roller 14. The cutting mechanism 16 includes a fixed table 17, which is arranged below the fed cover tape 12, and a cutting blade 18, which is arranged above the fed cover tape 12 to be vertically movable. When the cover tape 12 is adhered to the entire circumference of the bead core 11 as the bead core 11 is rotated, the cutting blade 18 is moved from an upper position indicated by solid lines in FIG. 1 to a lower position indicated by dashed lines to cut the cover tape 12.

Figure 4:
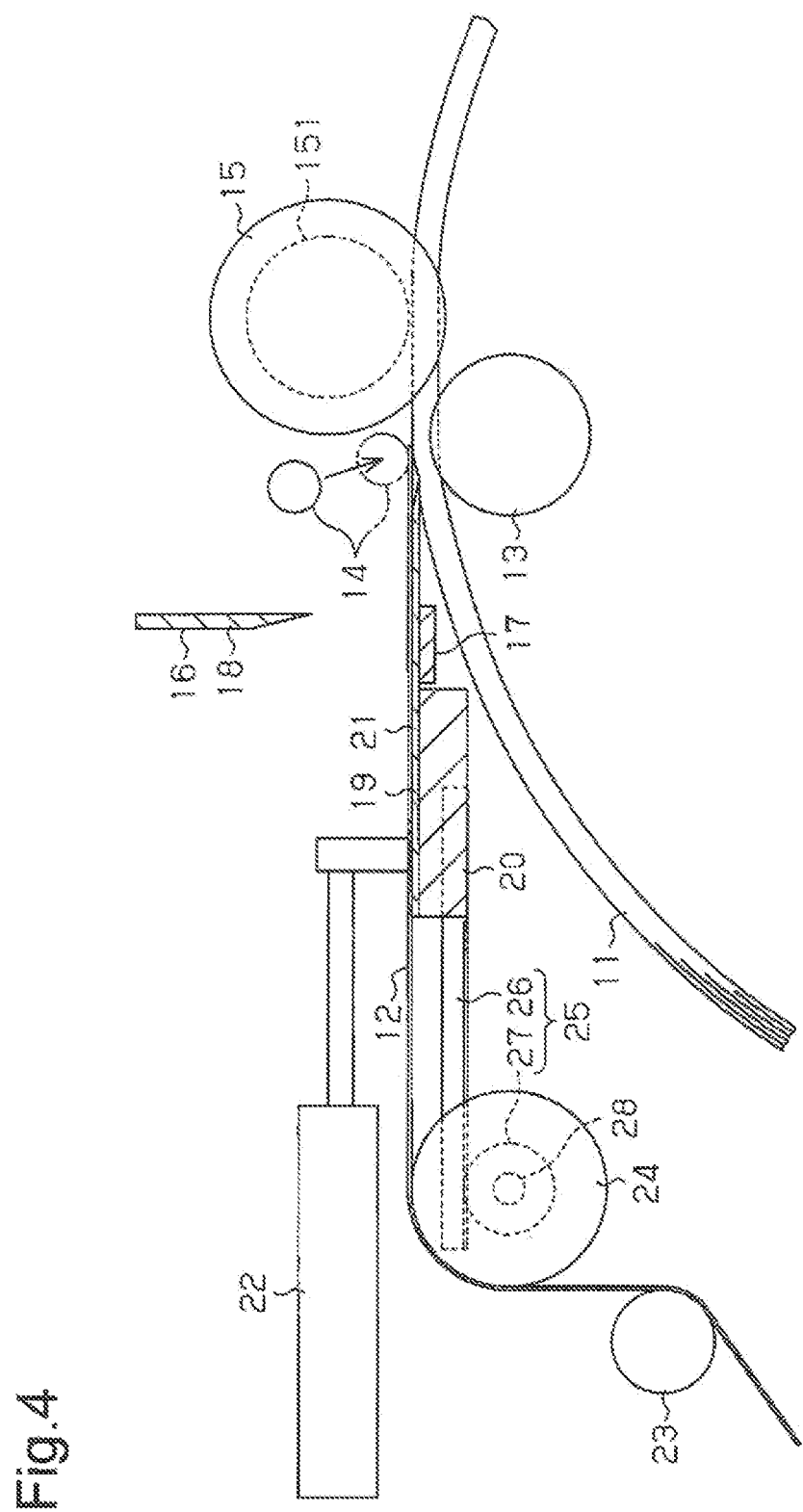
FIG. 4 is a cross-sectional view showing a primary part of the cover tape feed device of FIG. 1, illustrating an operating state.

As shown in FIG. 1, a cover tape feed device 19 is arranged on the cover tape feeding side of the cutting mechanism 16 (the left side as viewed in FIG. 1). The cover tape feed device 19 feeds one end of the cover tape 12 onto the surface of the bead core 11 at the start of the process of covering the bead core 11 with the cover tape 12. The cover tape feed device 19 includes a movable table 20 arranged to be reciprocated between a retracted position distant from the pressing roller 14 as shown in FIG. 1 and an advanced position close to the pressing roller 14 as shown in FIG. 4 in the delivering direction of the cover tape 12. A conveyance member 21 is attached to the movable table 20. The conveyance member 21 moves from the retracted position to the advanced position, i.e., toward the bead core 11, while supporting the cover tape 12 on its top face to convey one end of the cover tape 12 to the predetermined position on the surface of the bead core 11. A cylinder 22 is coupled to the movable table 20. The cylinder 22 functions as a driving member that moves the movable table 20 and the conveyance member 21 between the retracted position and the advanced position.

Figure 3:
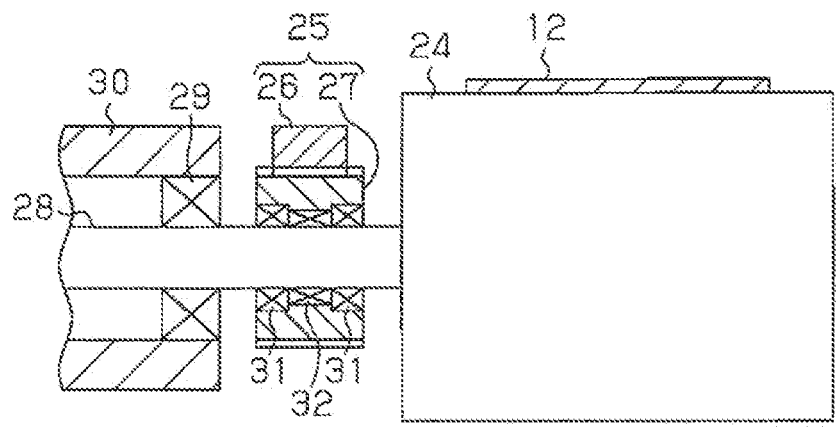
FIG. 3 is a partially enlarged cross-sectional view taken along line 3-3 of FIG. 1.

As shown in FIGS. 1 and 3, guide rollers 23 and 24 for guiding a feed of the cover tape 12 are arranged on the cover tape feeding side of the conveyance member 21. The guide roller 24 is arranged adjacent to the conveyance member 21. A transmission mechanism 25 is arranged between the guide roller 24 and the movable table 20, which is moved by the cylinder 22. The transmission mechanism 25 converts movement from the retracted position to the advanced position of the conveyance member 21 into rotation in the tape feeding direction of the guide roller 24 and transmits the rotation to the guide roller 24. The transmission mechanism 25 includes a rack 26, which is arranged in the movable table 20 to extend in the moving direction of the movable table 20, and a pinion 27, which is coupled to the guide roller 24 and engages with the rack 26. The pinion 27 is rotated by movement of the movable table 20 and the conveyance member 21. The pinion 27 is rotated in a first direction when the conveyance member 21 moves from the retracted position to the advanced position. The pinion 27 is rotated in a second direction when the conveyance member 21 moves from the advanced position to the retracted position.

As shown in FIGS. 1 and 3, the guide roller 24 is rotationally supported by a frame 30 via a shaft 28 and a bearing 29. The pinion 27 is supported by the shaft 28 via a pair of bearings 31 to rotate about the shaft 28. A one-way clutch 32 is arranged between the pinion 27 and the shaft 28 of the guide roller 24. With the movement from the retracted position to the advanced position of the conveyance member 21, the pinion 27 rotates in one direction (the first direction). Only the rotation in that direction is transmitted to the shaft 28 via the one-way clutch 32 so that the guide roller 24 rotates in the tape feeding direction. When the conveyance member 21 moves from the advanced position to the retracted position, the pinion 27 is rotated in the second direction. At this time, the one-way clutch 32 blocks the transmission of the rotation to the shaft 28 so that the guide roller 24 is maintained in the resting state.

Operation of the cover tape feed device configured as described above will now be described.

When the cover tape feed device 19 is in the process of covering the bead core 11 with the cover tape 12, the movable table 20 and the conveyance member 21 are located at the retracted position shown in FIG. 1. In this state, while the bead core 11 rotates clockwise of FIG. 1, the cover tape 12 is delivered to the predetermined position on the outer circumferential surface of the bead core 11 along the top face of the conveyance member 21. As shown in FIG. 2, the shaping face 151 of the shaping roller 15 holds the cover tape 12 at the widthwise center to cover the surface of the bead core 11. In this way, the entire circumference of the bead core 11 is covered with the cover tape 12. The cutting blade 18 of the cutting mechanism 16 moves from the upper position indicated by solid lines in FIG. 1 to the lower position indicated by dashed lines to cut the cover tape 12 between the cutting blade 18 and the fixed table 17.

During the process of covering the bead core 11 with the cover tape 12, the pressing roller 14 is located at the lower position indicated by a solid line in FIG. 1. In completion of the above-described process of covering the bead core 11 with the cover tape 12, the pressing roller 14 moves from the lower position to the upper position indicated by a dashed line in FIG. 1. The covered bead core 11 is removed from the process area, and then an uncovered bead core 11 is placed in the process area. After that, when the cylinder 22 is moved to protrude while the conveyance member 21 supports the cover tape 12 on its top face, the movable table 20 and the conveyance member 21 are moved from the retracted position shown in FIG. 1 to the advanced position shown in FIG. 4. Thus, an end of the cover tape 12 is conveyed to the predetermined position on the surface of the bead core 11.

At this time, the movement from the retracted position to the advanced position of the conveyance member 21 is transmitted to the shaft 28 as rotation in one direction via the rack 26, the pinion 27, and the one-way clutch 32 of the transmission mechanism 25. The guide roller 24 is rotated in the tape feeding direction, in which the cover tape 12 is fed. Thus, the cover tape 12 is fed to the predetermined position on the surface of the bead core 11 with no resistance. This reduces the longitudinal elongation of the cover tape 12, which is caused by being pulled, and limits the decrease in the widthwise size with the elongation of the cover tape 12. As a result, the cover tape 12 is allowed to ensure a necessary width for being adhered to the bead core 11 while covering the surface.

While the cover tape 12 is conveyed onto the bead core 11, the pressing roller 14 is moved from the upper position to the lower position. With the movement, an end of the cover tape 12 is sandwiched between the pressing roller 14 and the outer circumferential surface of the bead core 11. After that, when the cylinder 22 is retracted, the movable table 20 and the conveyance member 21 are moved to return to the retracted position shown in FIG. 1 from the advanced position shown in FIG. 4, with the end of the cover tape 12 placed on the bead core 11. At this time, with the return of the conveyance member 21, the pinion 27 is rotated in the second direction via the rack 26 of the transmission mechanism 25. In this case, the one-way clutch 32 blocks the transmission of the rotation to the shaft 28. This prevents the guide roller 24 from being rotated in the opposite direction to the cover tape feeding direction.

After that, the bead core 11 is rotated clockwise of FIG. 1. With the rotation, the cover tape 12 starts to be adhered to the bead core 11 to cover the surface.

Accordingly, the present embodiment achieves the following advantages.

(1) The cover tape feed device 19 includes the conveyance member 21, which is moved while supporting the cover tape 12 to convey the cover tape 12 to the predetermined position on the surface of the bead core 11. The guide roller 24 for guiding a feed of the cover tape 12 is arranged on the cover tape feeding side of the conveyance member 21. The transmission mechanism 25 converts the movement from the retracted position to the advanced position of the conveyance member 21 into rotation in the tape feeding direction of the guide roller 24 and transmits the rotation to the guide roller 24.

For this reason, in the cover tape feed device 19, the conveyance member 21 is moved toward the bead core 11 while supporting the cover tape 12 so that the cover tape 12 is conveyed to the predetermined position on the surface of the bead core 11. At this time, the transmission mechanism 25 converts the movement from the retracted position to the advanced position of the conveyance member 21 into rotation in the tape feeding direction of the guide roller 24 and transmits the rotation to the guide roller 24. Thus, the guide roller 24 steadily rotates in the tape feeding direction to deliver the cover tape 12 onto the bead core 11 with no resistance. This eliminates a risk of decreasing the width of the cover tape 12, which is caused by longitudinal elongation of the cover tape 12 when being fed to the bead core 11. As a result, the cover tape 12 is allowed to ensure a sufficient width for being adhered to the bead core 11 to cover the surface.

(2) The cover tape feed device 19 includes the cylinder 22 that functions as a driving member to move the conveyance member 21. Thus, the conveyance member 21 is reciprocated within a predetermined range by the cylinder 22 to properly feed the cover tape 12 to the predetermined position on the surface of the bead core 11.

(3) The cover tape feed device 19 includes the transmission mechanism 25, which is arranged between the cylinder 22 and the guide roller 24. Thus, the guide roller 24 is properly rotated in the tape feeding direction via the transmission mechanism 25 when the conveyance member 21 is moved from the retracted position to the advanced position by the cylinder 22.

(4) In the cover tape feed device 19, the transmission mechanism 25 includes the rack 26, which is moved by the cylinder 22, and the pinion 27, which is coupled to the guide roller 24 and engages with the rack 26. Thus, the transmission mechanism 25 has a simple structure and is capable of transmitting movement of the conveyance member 21 to the guide roller 24 by converting the movement into rotation of the guide roller 24.

(5) The cover tape feed device 19 includes the one-way clutch 32. The one-way clutch 32 is arranged between the pinion 27 and the guide roller 24 and only transmits, to the guide roller 24, rotation in one direction of the pinion 27 caused by movement from the retracted position to the advanced position of the conveyance member 21. This prevents the guide roller 24 from being rotated in the opposite direction to the tape feeding direction via the rack 26 and the pinion 27 of the transmission mechanism 25 when the conveyance member 21 is moved to return from the advanced position to the retracted position.

Modifications

The above-illustrated embodiment may be modified as described below.

In the above-illustrated embodiment, the cover tape 12 is fed onto the surface on the outer circumferential side of the bead core 11. However, the cover tape 12 may be fed onto the surface on the inner circumferential side or the lateral side of the bead core 11.

In the above-illustrated embodiment, the transmission mechanism 25 may be arranged between the guide roller 24 and the cylinder 22 as a driving member or between the guide roller 24 and the conveyance member 21.

In the above-illustrated embodiment, the transmission mechanism 25 may include, e.g., a chain and a sprocket instead of the rack 26 and the pinion 27.

In the above-illustrated embodiment, the cylinder 22 may be replaced by, e.g., a linear motor as a driving member.

DESCRIPTION OF THE REFERENCE NUMERALS

11 . . . bead core, 12 . . . cover tape, 14 . . . pressing roller, 15 . . . shaping roller, 19 . . . cover tape feed device, 20 . . . movable table, 21 . . . conveyance member, 22 . . . cylinder (driving member), 24 . . . guide roller, 25 . . . transmission mechanism, 26 . . . rack, 27 . . . pinion, 28 . . . shaft, 32 . . . one-way clutch.

The invention claimed is:

1. A cover tape feed device for feeding a cover tape onto a surface of a bead core, the cover tape feed device comprising:
   a conveyance member that is capable of reciprocating between an advanced position and a retracted position, wherein the conveyance member moves from the retracted position to the advanced position while supporting the cover tape and conveys the cover tape onto the surface of the bead core;
   a guide roller for guiding a feed of the cover tape, wherein the guide roller is arranged to be rotational at a position farther from the bead core than the conveyance member is from the bead core;
   a transmission mechanism that converts movement from the retracted position to the advanced position of the conveyance member into rotation in a tape feeding direction of the guide roller; and
   a cutting mechanism that cuts the cover tape, wherein
   the cutting mechanism includes a cutting blade that is capable of moving to cut the cover tape,
   a direction that is directed to the advanced position from the retracted position is an advancing direction,
   the conveyance member includes a leading end in the advancing direction,
   when the conveyance member is located at the advanced position, the leading end of the conveyance member is located on a leading side of a cutting edge of the cutting blade in the advancing direction, and
   when the conveyance member is located at the retracted position, the leading end of the conveyance member is located on a trailing side of the cutting edge of the cutting blade in the advancing direction.

2. The cover tape feed device according to claim 1, comprising a driving member for moving the conveyance member.

3. The cover tape feed device according to claim 2, wherein the transmission mechanism is arranged between the driving member and the guide roller.

4. The cover tape feed device according to claim 3, wherein the transmission mechanism includes:
   a rack, which is moved together with the conveyance member by the driving member; and a pinion, which is coupled to the guide roller and engages with the rack to be rotated as the conveyance member is moved.

5. The cover tape feed device according to claim 4, further comprising a one-way clutch arranged between the pinion and the guide roller, wherein the one-way clutch only transmits, to the guide roller, rotation in one direction of the pinion caused by movement from the retracted position to the advanced position of the conveyance member.

* * * * *